Aug. 11, 1953  H. D. EUWER ET AL  2,648,292
RAILWAY TRAIN
Filed June 22, 1948
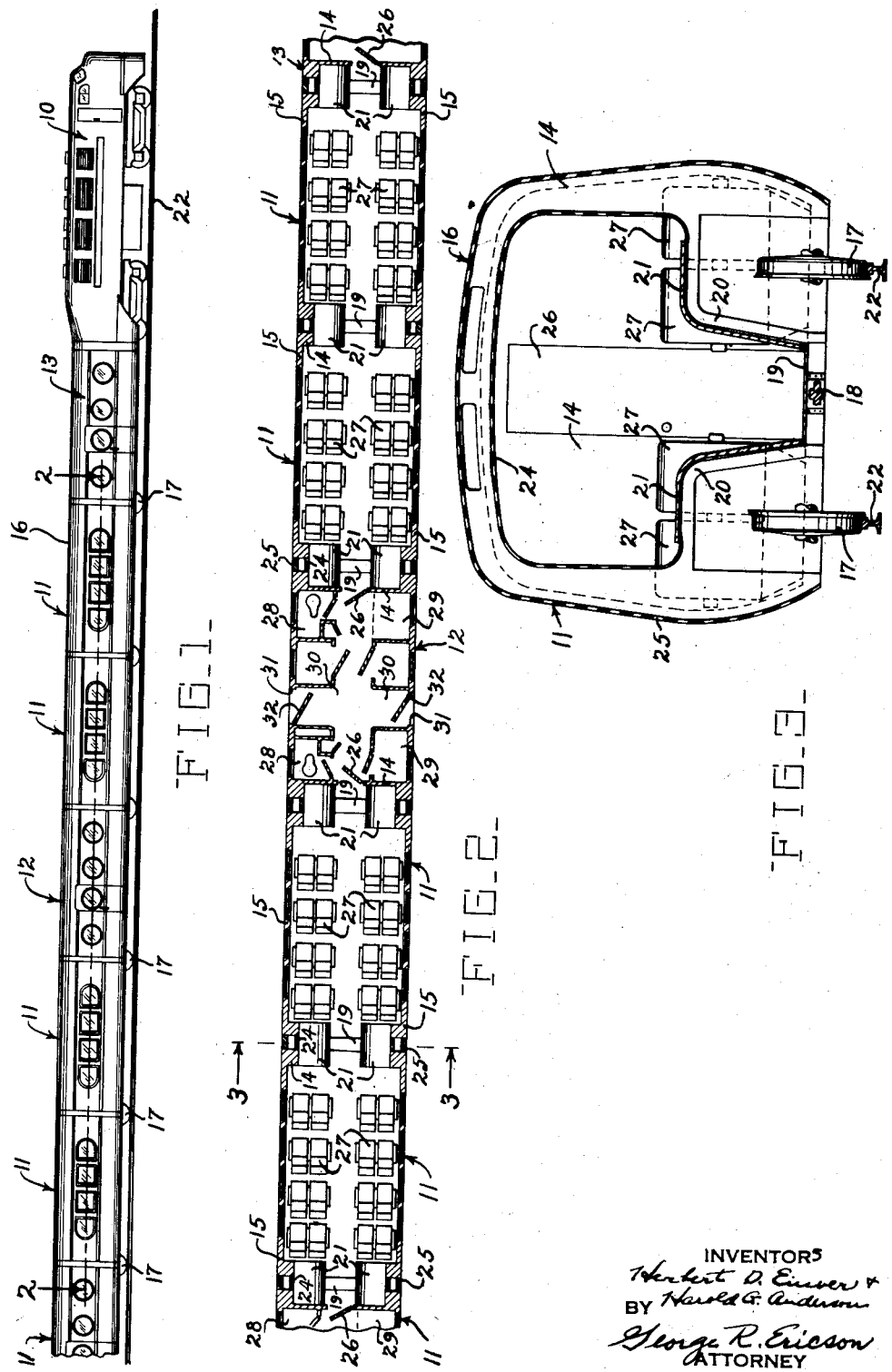
INVENTORS
Herbert D. Euwer &
BY Harold G. Anderson
George R. Ericson
ATTORNEY

Patented Aug. 11, 1953

2,648,292

UNITED STATES PATENT OFFICE

2,648,292

RAILWAY TRAIN

Herbert D. Euwer, Kirkwood, Mo., and Harold G. Anderson, Fort Lee, N. J., assignors to American Car and Foundry Company, New York, N. Y., a corporation of New Jersey Application June 22, 1948, Serial No. 34,408

2 Claims. (Cl. 105—4)

This invention relates to railway trains.

A recent trend in railway passenger train design is to lower the floors and materially shorten the length of cars to such an extent that several cars are required to equal the length of the standard car now in use. In one such type of train, cars carried on two rear wheels are coupled together trailer fashion and are not more than eight times the track gauge, such a train being shown in application Serial Number 661,699, filed April 12, 1946, by Alejandro Goicoechea Omar, issued February 22, 1949 as Patent 2,462,666.

An object of this invention is to provide a railway train, of the character mentioned, in which maximum passenger space and comfort is attained through the use of a service car between passenger cars.

Another object of the invention resides in a railway passenger train, of the character referred to, made up of units each comprising an odd number of end communicating cars with the central car having a side opening forming the only provision for the ingress and egress of passengers.

A further object of the invention is to provide a train, of the character mentioned in which maximum space is attained in passenger cars through the use of an intermediate service car equipped with baggage space and toilet facilities suitable for passenger requirements.

These and other objects of the invention will be apparent to those skilled in the art from a study of the following description and accompanying drawings, in which:

Figure 1 is a side elevation of a passenger train incorporating the invention.

Figure 2 is a sectional view of one unit of cars in the train taken on line 2—2 of Figure 1.

Figure 3 is a sectional view of one of the passenger cars taken on line 3—3 of Figure 2.

The illustrated train is made up of a locomotive 10, passenger cars 11, service cars 12 and a baggage car 13. Generally, the car bodies are formed similarly with end walls 14, side walls 15 and a roof 16. A pair of rear wheels 17 carry each car and adjacent car ends are connected by central couplings 18 in trailer relation, details of which are shown in application Serial Number 733,096, filed March 7, 1947, by Alfred A. Gassner. The car floors 19 extend below the axis of the supporting wheels and the car bodies are formed with end wheel housings 20 having covers 21 overlying the adjacent housings of adjacent cars. In length the cars are preferably not more than eight times the gauge of tracks 22. Flexible diaphragms 24 and 25 extend around the inner and outer end walls of adjacent cars and enclose the space therebetween.

The train is preferably made up of units each comprising an odd number of cars with a service car located between passenger cars. As shown in the drawings, each unit is composed of five cars with a central service car and two passenger cars at each end thereof. The end walls of the service car and the end wall of the extreme passenger cars remote from the service cars have normal sized openings therein with which doors 26 are associated. The opening in the adjacent end walls of the pair of passenger cars at each end of the unit are relatively large and have no doors, the interior area of each pair of passenger cars is continuous except for the wheel housings. The interior of the passenger cars contain only seats 27, preferably arranged in double rows at each side of a center aisle, so that maximum space and comfort for passengers are provided.

The service cars are provided with rooms 28 and 29 on each side of a center aisle, rooms 28 containing toilet facilities and rooms 29 being suitable for the storage of baggage. Transverse aisles 30 extend between the service car center aisle and openings 31 in the service car side walls. These side openings are adapted to be closed by doors 32.

It will be noted that passengers can enter and leave the train unit only through the service car side openings. An attendant in each service car can safely control each unit as ingress and egress of passengers at each station will be through one of the side openings.

The invention may be modified in various respects as will occur to those skilled in the art and the exclusive use of all modifications as come within the scope of the appended claims is contemplated.

What is claimed is:

1. In a trailer type railway train, a plurality of relatively short passenger cars free of exit and entrance doorways in the side walls and a relatively short service car coupled therebetween, said service car having a center aisle and service compartments between the aisle and its sides, each of said cars being supported on an axle carrying a pair of wheels extending partially beyond the rear end thereof, said cars each having a body with passageways through the end walls and an aisle extending between said passageways, said flooring being in a plane adjacent that of the axes of the wheels, partial wheel wells at each end of each of the sides of the cars for mutual association with partial wheel wells of adjacent cars to provide well structures for housing the wheels when the cars are coupled together, said wheel well structures in said cars extending a substantial distance above the flooring, said end wall passageways being the only means through which passengers can pass from car to car, seats extending continuously along the sides of the passenger cars from one partial wheel well to the other, said service car end passageways registering with and being in alignment with the passageways through the end walls of the passenger cars, said service car having an inlet and exit door in at least one side wall intermediate the partial wheel housings, whereby passenger entrance and exit on and off of the train is solely through said side door of the service car, thereby increasing seating capacity in the passenger cars equal to the eliminated side entrance.

2. In a trailer type railway train, a plurality of relatively short passenger cars free of exit and entrance doorways in the side walls and relatively short service car coupled therebetween, said cars being of a length not more than eight times the track gauge, said service car having a center aisle and service compartments between the aisle and its sides, each of said cars being supported on an axle carrying a pair of wheels extending partially beyond the rear end thereof, said cars each having a body with passageways through the end walls and an aisle extending between said passageways, said flooring being in a plane adjacent that of the axes of the wheels, partial wheel wells at each end of each of the sides of the cars for mutual association with partial wheel wells of adjacent cars to provide well structures for housing the wheels when the cars are coupled together, said wheel well structures in said cars extending a substantial distance above the flooring, said end wall passageways being the only means through which passengers can pass from car to car, seats extending continuously along the sides of the passenger cars from one partial wheel well to the other, said service car end passageways registering with and being in alignment with the passageways through the end walls of the passenger cars, said service car having an inlet and exit door in at least one side wall intermediate the partial wheel housings, whereby passenger entrance and exit on and off of the train is solely through said side door of the service car, thereby increasing seating capacity in the passenger cars equal to the eliminated side entrance.

HERBERT D. EUWER.
HAROLD G. ANDERSON.

References Cited in the file of this patent

UNITED STATES PATENTS

| Number | Name | Date |
|---|---|---|
| 1,110,394 | Lindall | Sept. 15, 1914 |
| 1,168,335 | Rowntree | Jan. 18, 1916 |
| 1,557,587 | Hodgson | Oct. 20, 1925 |
| 1,700,898 | Kapf | Feb. 5, 1929 |
| 2,462,666 | Omar | Feb. 22, 1949 |

OTHER REFERENCES

Prof. Von Borries (Publ.) R. R. Gazette, vol. 35, page 605, August 21, 1903.